United States Patent [19]

Suetsugu et al.

[11] 3,992,218

[45] Nov. 16, 1976

[54] BLACK COLORING AGENT

[75] Inventors: Kensuke Suetsugu; Eiji Maruyama; Katsuyuki Same, all of Kita-Kyushu, Japan

[73] Assignee: Mitsubishi Chemical Industries, Ltd., Tokyo, Japan

[22] Filed: May 2, 1975

[21] Appl. No.: 574,244

[30] Foreign Application Priority Data

May 2, 1974 Japan.............................. 49-49567
May 8, 1974 Japan.............................. 49-50872

[52] U.S. Cl............................... 106/307; 423/445; 423/449
[51] Int. Cl.².......................................... C09C 1/48
[58] Field of Search ............ 106/307; 423/445, 450, 423/449

[56] References Cited

UNITED STATES PATENTS 3,301,694   1/1967   Kraus et al........................... 106/307
3,565,657   2/1971   Dannenberg et al. ............... 106/307

*Primary Examiner*—Winston A. Douglas
*Assistant Examiner*—J. V. Howard
*Attorney, Agent, or Firm*—Oblon, Fisher, Spivak, McClelland & Maier

[57] ABSTRACT

A carbon black coloring agent is obtained by (1) mixing a hydrophobic vehicle with an aqueous slurry containing a carbon black obtained by treating a furnace black having an electromicroscopic average particle size of from about 5 to about 35 m$\mu$ with a modifier selected from the group consisting of ozone, nitric acid, hydrogen peroxide, chromic acid and permanganate, and (2) removing the water.

11 Claims, No Drawings

BLACK COLORING AGENT

BACKGROUND OF THE INVENTION

1. Field of the Invention

The present invention relates to a black coloring agent and a preparation thereof.

More particularly, it relates to an industrially advantageous preparation of a coloring agent having excellent characteristics by using furnace carbon black as the coloring component.

2. Description of the Prior Art

In the past, carbon blacks have been used as black coloring agents for various industrial inks, paints, synthetic resins and the like. Heretofore, only channel blacks have been used as high color carbon blacks having excellent jetness. Furnace blacks have been considered to be unsuitable for use as high coloring carbon blacks because of their inferior jetness and dispersibility. However, channel blacks are quite expensive because of low productivity and have the further attendant disadvantage in that they cause a serious pollution problem due to discharge gas emanating from the apparatus used for their production.

Accordingly, it has been proposed to prepare a high color carbon black by using furnace blacks instead of channel blacks. However, satisfactory results have not yet been attained. It has been known to treat carbon blacks with a gaseous oxidizing agent such as ozone, nitrogen oxides, oxygen, air and the like as a means for modifying their surface properties. Thus, their coloring characteristics when used in inks or paints can be slightly improved by modifying the properties of their surfaces by oxidation. However, the fundamental disadvantage of furnace black, its especially low dispersibility, has been difficult to satisfactorily improve upon. Because the dispersibility of a carbon black usually deteriorates with increasingly higher coloring ability, i.e., high jetness, dispersibility becomes quite a critical property for preparing a high color furnace black. If the dispersibility is inferior, desirable coloring characteristics will not be present when the carbon black is incorporated in inks, paints, resins and the like.

Two techniques have been attempted in the past to increase the dispersibility. It has been known to prepare a mixture of a pigment and a hydrophobic vehicle by mixing the pigment with water to form an aqueous slurry. Oil is then added to the slurry with stirring to transfer the pigment to the oil as a means for dispersing a pigment in a hydrophobic vehicle. This is referred to as a flushing method. However, when the flushing method has been applied to carbon black, it has been difficult both to obtain uniform particle sizes in the carbon black mixture and to improve the dispersibility of the carbon black as present in paints, inks, resins and the like. Accordingly, the flushing method has been rarely applied, except in very special cases.

It has also been known to add a small amount of a surfactant in the preparation of an aqueous slurry of carbon black as a means for uniform dispersion. However, part of the surfactant is adsorbed on the carbon black and remains with the coloring agent. Accordingly, the dispersibility may be deteriorated by the surfactant when the coloring agent is incorporated in paints, inks, resins and the like. Moreover, the surfactant may deteriorate the desirable characteristics of the paints, inks, resins and the like. Consequently, it would be most desirable to have a method of preparing a furnace carbon black which has both satisfactory dispersibility and high jetness.

SUMMARY OF THE INVENTION

Accordingly, it is an object of the present invention to provide a coloring agent having the excellent characteristics of the channel blacks by using a furnace black.

It is another object of this invention to provide a coloring agent having uniform particle size and excellent jetness, gloss and dispersion stability as well as high dispersibility as a coloring agent for paints, inks, resins and the like by using a furnace black having specified properties, treating the surface of the furnace black with a specified agent in order to modify it and then flushing the modified furnace black. The performance properties of the coloring agent are the same or higher than those of the channel black.

Briefly, these and other objects of this invention, as will hereinafter become clear from the ensuing discussion, have been attained by providing a black coloring agent which comprises a carbon black modified with an oxidizing agent and flushed with a hydrophobic vehicle, wherein the carbon black is prepared by oxidizing a furnace black having an electromicroscopic average particle size of about 5 to 35 m$\mu$ with an oxidizing agent selected from a group consisting of ozone, nitric acid, hydrogen peroxide, chromic acid and permanganate, thereby modifying it and flushing an aqueous slurry of the modified carbon black with a hydrophobic vehicle.

DETAILED DESCRIPTION OF PREFERRED EMBODIMENTS

The furnace black used in the invention should have an electromicroscopic average particle size of about 5 – 35 m$\mu$, preferably about 5 – 20 m$\mu$. When the particles are larger than 35 m$\mu$, it is difficult to obtain the desirable jetness. It is especially preferable to use a furnace black having an electromicroscopic average particle size of about 5 – 20 m$\mu$, a specific surface area of about 180 – 1200 m$^2$/g and an oil adsorption of about 35 – 100 ml /100 g. The specific surface area of the furnace black is usually about 180 – 1200 m$^2$/g and especially 190 – 450 m$^2$/g. When the area is less than 180 m$^2$/g, it is difficult to obtain the desirable jetness. When the value is more than 1,200 m$^2$/g, both the dispersibility and dispersion stability of the carbon black when in the form of a coloring agent may be deteriorated. The oil absorption of the furnace black is usually about 35 – 100 ml/100 g, preferably 50 – 80 ml /100 g. When this parameter is more than 100 ml 100 g, the loading capacity of the product in the ink, paint, resin or the like is decreased and it is difficult to obtain the desirable jetness. When the value is too low, the dispersibility of the carbon black is decreased. An excellent coloring agent is obtained when a furnace black having all three characteristics specified above is used.

Note that throughout the specification, particle size refers to electromicroscopic average particle size; specific surface area means specific surface area (m$^2$) per 1 g of carbon black measured by the BET method which involves nitrogen adsorption at low temperature; and oil absorption refers to the capacity (ml) of dibutyl terephthalate absorbed in 100 g of carbon black as measured by ASTM 2414–65T. With regard to the latter property, it is preferred to use a furnace black having a structure index (i.e., percentage ratio of its oil absorption to the oil absorption of standard carbon black having the same specific surface area) of less than 100, especially less than 80.

In this invention, it is necessary to prepare an aqueous slurry containing a modified carbon black which is prepared by modifying the furnace black having the aforementioned characteristics with a specific oxidizing agent. There are two methods for performing this step. In the first method for preparation of the aqueous slurry, an aqueous medium such as water or water-alcohol and the furnace black are mixed with stirring at a temperature from about 20°– 100° C, usually at room temperature, and the specific oxidizing agent is added to the mixture. Alternatively, the furnace black can be admixed with a mixture of the aqueous medium and the specific oxidizing agent. When ozone is used as the specific oxidizing agent, it may be introduced from the bottom of the vessel while the mixture of the aqueous medium and carbon black is stirred. In the second method for preparation of the aqueous slurry, a modified carbon black prepared by contacting the specific oxidizing agent with the furnace black is mixed with the aqueous medium at 20° – 100° C.

Suitable oxidizing agents used in this invention include nitric acid, chromic acid, e.g., chromic anhydride, permanganate, e.g., potassium permanganate, hydrogen peroxide, and ozone. When nitric acid or chromic acid is used, the amount employed is usually $1.0 \times 10^{-6}$ to about $100 \times 10^{-6}$, preferably $5 \times 10^{-6}$ to about $80 \times 10^{-6}$ mole per unit of specific surface area ($m^2/g$) of the furnace black. If the content is less than said range, it is difficult to obtain uniform particle distribution of the coloring agent. If it is higher than said range, the affinity of the carbon black to the hydrophobic vehicle is decreased. When permanganate or hydrogen peroxide is used, the amount employed is usually $2.0 \times 10^{-6}$ to about $40 \times 10^{-6}$, preferably $5 \times 10^{-6}$ to about $20 \times 10^{-6}$ mole per unit of the specific surface area ($m^2/g$) of the furnace black. If the content is less than said range, it is difficult to attain desirable performance properties for use as a coloring agent. If it is higher than said range, the affinity of the carbon black to the hyrophobic vehicle is decreased.

When ozone is used, the amount used should produce 1.5 – 6.0 microequivalents of total acidity of the carbon black surface per unit of the specific surface area of the carbon black. The total acidity is measured by the method disclosed in Rubber Chemistry and Technology, Vol. 36, 729–739, wherein 50 ml of a mixture of NaCl and NaOH (58.5 g of NaCl and 8.0 g of NaOH per 1 liter of water) is added to 5.0 g of carbon black. The mixture is stirred for 2 hours and is separated by a centrifugal separator. 5 g of the supernatant liquid is sampled and titrated by a 0.025 N–HCl standard solution with an indicator. The total acidity is given by the following equations:

$$\text{Acidity} = \frac{(B-S) \times N}{W} \times \frac{50}{5} \times 1,000$$

(microequivalents per g carbon))
B; titrated volume of HCl standard solution required for the black (ml)
S; titrated volume of HCl standard solution required for sample solution (ml)
N; normality of HCl standard solution (N)
W; amount of carbon black (g).

$$\text{Total acidity} = \frac{\text{acidity (microequivalent/g (carbon))}}{\text{specific surface area of carbon black } (m^2/g)}$$

(microequivalents per $m^2$)

When the total acidity of the surface of the carbon black is less than 1.5 microequivalents per 1 $m^2$, it is difficult to obtain a product having an improved dispersibility, and the other characteristics of the coloring agent, jetness, tinting strength, dispersion stability, are similar to those of the conventional furnace black. When the value is more than 6.0 microequivalents per 1 $m^2$, it is difficult to separate the water from the carbon black during the flushing with a hydrophobic vehicle. The modification with ozone is preferably carried out at a relatively low temperature such as room temperature.

The ammount of the carbon black employed relative to the amount of aqueous medium is usually 6 – 60 wt. %, preferably 10 – 40 wt. %. Suitable stirring techniques for the aqeuous mixture include any conventional stirrers. The device may be selected according to the viscosity of the aqueous mixture. A simple impeller type or the like may be used in the case of low viscosity, and a three roller mill or the like may be used in the case of high viscosity.

In this invention, the hydrophobic vehicle is added to the aqueous slurry with stirring in the flushing operation. Suitable hydrophobic vehicles for use in this invention include the various hydrophobic liquid media used for conventional flushing operations. It is preferred to select the desired vehicle depending upon the material combined with the coloring agent in the ink, paint, resin and the like. For example, if the use of the coloring agent is for inks, paints, and the like, it is preferred to use toluene, xylene, mineral spirits and other hydrocarbon type solvents; butanol and higher alcohols; natural oil varnish, e.g., linseed oil varnish or tung oil varnish; synthetic resin varnish and the like. If the agent is used for polyvinyl chloride, it is preferable to use a plasticizer such as dioctylphthalate, dibutylphthalate or the like. The amount of the hydrophobic vehicle employed depends upon the nature of the vehicle itself. Preferably, 0.5 – 5.0 wt. parts to 1 wt. part of carbon black are used. When the amount is more than 5.0 wt. parts, the coloring agent becomes soft and pasty, whereby it is hard to separate from water. When it is less than 0.5 wt. part, it is hard to transfer all of the carbon black from the aqueous slurry to the hydrophobic vehicle. The conditions employed in the flushing operation are not critical. It is preferred that the temperature be the same as the temperature used in the preparation of the aqueous slurry, i.e., about 20°– 100° C, usually room temperature. It is also preferred that the hydrophobic vehicle is added at uniform speed. The separation of the coloring agent from the aqueous medium after the flushing operation can be performed by any conventional method. Suitable techniques include decantation, sieving, centrifugal dehydration and the like. If desired, water remaining on the surface of the coloring agent can be removed by hot air after the separation. It is possible to either leave the hydrophobic vehicle in the coloring agent or to remove it from the coloring agent.

The coloring agent of this invention possesses excellent characteristics as a black coloring agent in inks, paints, synthetic resins and the like. The dispersibility, which is a serious problem for the conventional black coloring agents, is remarkably improved. The evaluative characteristics such as the jetness, gloss and tinting strength of the black coloring agent and the flow properties and dispersion stability of the resultant ink and paint are remarkably improved over those of the conventional black coloring agents prepared from a furnace black. The black coloring agent of this invention has especially high jetness and dispersibility which cannot be attained by using a conventional furnace black and these properties are equivalent or superior to those of high color channel black.

Having generally described the invention, a more complete understanding can be obtained by reference to certain specific examples, which are included for purposes of illustration only and are not intended to be limiting unless otherwise specified. In the examples, the unit of the specific surface area is m$^2$/g.

REFERENCE EXAMPLE 1

Furnace carbon black having an average particle size of 18 m$\mu$, a structure index of 50 and a specific surface of 200 m$^2$/g (Furnace black MCF-88 manufactured by Mitsubishi Chemical Industries, Ltd), was used. In a cylindrical round bottom vessel made of stainless steel, 15 kg of the furnace carbon black and 70 kg of water were charged at room temperature. The mixture was stirred with an impeller type stirrer at a peripheral velocity of 3 m/second for 30 minutes to prepare an aqueous slurry. In the same vessel under the same stirring conditions and at room temperature, 17 kg of toluene was added at the rate of 35 g/min. of toluene per 1 kg of carbon black. After the addition, the mixture was further stirred for 20 minutes. The mixture was then filtered through a sieve. The resulting granules were dehydrated by a centrifugal hydroextractor to obtain Coloring Agent No. 1 which was difficult to granulate in the flushing step.

REFERENCE EXAMPLE 2

In a reactor made of stainless steel equipped with a stirrer, 10 kg of furnace carbon black was charged. An ozone containing gas prepared from an ozonizer was fed from the bottom of the reactor with stirring, at the rate of 5 m$^3$/hr. so as to yield 0.08 wt. part of ozone per 1 wt. part of the carbon black. As a result, a modified carbon black, Coloring Agent No. 2, having a total acidity of 2.3 microequivalents per unit of specific surface area of the carbon black was obtained.

EXAMPLE 1

In the vessel equipped with the stirrer of Reference Example 1, 15 kg of the furnace carbon black of Reference Example 1, 70 kg of water and $48 \times 10^{-6}$ mole of 63% HNO$_3$ per unit of specific surface area of the carbon black were charged. The mixture was treated to prepare an aqueous slurry and was flushed in accordance with the process of Reference Example 1 to obtain Coloring Agent No. 3.

EXAMPLE 2

In the vessel equipped with the stirrer of Reference Example 1, 15 kg of the furnace carbon black of Reference Example 1, 70 kg of water and $14.7 \times 10^{-6}$ mole of 30% H$_2$O$_2$ per unit of specific surface area of the carbon black were charged. The mixture was treated to prepare an aqueous slurry and was flushed in accordance with the process of Reference Example 1 to obtain Coloring Agent No. 4.

EXAMPLE 3

In a cylindrical round bottom vessel made of stainless steel, 15 kg of the modified carbon black of Reference Example 2 and 85 kg of water were charged. The mixture was stirred with an impeller type stirrer at room temperature for 30 minutes to prepare an aqueous slurry. In accordance with the process of Reference Example 1, 17 kg of toluene was added with stirring and the mixture was further stirred for 20 minutes. After stirring operation, the mixture was filtered through a sieve and dehydrated to obtain Coloring Agent No. 5. The size distributions of Coloring Agents Nos. 3, 4 and 5 were compared with that of Coloring Agent No. 1. The conclusion was that Coloring Agents Nos. 3, 4 and 5 had an excellent uniform distribution of pellets as shown in Table 1. The size distribution was measured by ASTM D1151–60.

TABLE 1

| Coloring Agent | | | No. 1 | No. 3 | No. 4 | No. 5 |
|---|---|---|---|---|---|---|
| Size distribution | | | (%) | (%) | (%) | (%) |
| | | >2000$\mu$ | 4.5 | 6.0 | 5.3 | 1.2 |
| 1000 | ~ | 2000$\mu$ | 12.0 | 53.4 | 51.6 | 3.5 |
| 500 | ~ | 1000 $\mu$ | 33.4 | 38.7 | 39.1 | 57.3 |
| 250 | ~ | 500$\mu$ | 29.3 | 3.8 | 3.7 | 37.0 |
| 125 | ~ | 250$\mu$ | 13.2 | 0.1 | 0.2 | 1.0 |
| | | <125$\mu$ | 7.6 | 0 | 0.1 | 0 |

Coloring Agent Nos. 1, 3 and 4 were compared with respect to their properties in paints and in plastics as described below. As shown in Table 2, Coloring Agents Nos. 3 and 4 were excellent.

A. Jetness:

A plate coated with a melamine-alkyd black enamel and a polyvinyl chloride colored sheet were prepared by using Coloring Agent No. 1. These elements were used as standards. Similar coated plates and colored sheets were prepared by using the other coloring agents and they were visually compared as to jetness under light using the following rating system:

| A | Remarkably superior to Standard | 14 |
|---|---|---|
| B | Superior to Standard | 12 |
| C | Same as Standard | 10 |
| D | Inferior to Standard | 8 |
| E | Highly inferior to Standard | 6 |
| F | Remarkably inferior to Standard | 3 |

B. Gloss:

The coated plates and colored sheets were also visually observed and rated as to gloss in accordance with the rating system described above.

C. Dispersibility:

Dispersibility of the coloring agents in the paint was measured by coating the paint on a slide glass and observing with a microscope (400 × magnification). It was rated in accordance with the above test procedure.

D. Tinting strength in a grey sheet:

A grey enamel was prepared by blending 1 part of black enamel and 4.5 parts of white melamine alkyd enamel (manufactured by Kansai Paint Co.). The grey enamel was coated onto a plate. The coated plates were visually observed and rated against the standard, in accordance with the test procedures above.

E. Dispersibility of Colored Resin:

Thin black colored sheets were prepared by using polyvinyl chloride separately with each coloring agent.

They were observed by a microscope (100 × magnification) and rated in accordance with the tests of the properties of the paint.

TABLE 2

| | Coloring Agent | | No. 1 | No. 3 | No. 4 |
|---|---|---|---|---|---|
| Properties in paints | Black enamel | Jetness | 10 | 13 | 12 |
| | | Gloss | 10 | 15 | 14 |
| | | Dispersibility | 10 | 13 | 13 |
| | Tinting strength in grey enamel | | 10 | 16 | 15 |
| Properties in plastics | Black sheet | Jetness | 10 | 12 | 11 |
| | | Dispersibility | 10 | 14 | 14 |
| | Tinting strength in grey sheet | | 10 | 13 | 12 |

The performance properties of Coloring Agents Nos. 1, 2 and 5 were compared as shown in Table 3.

TABLE 3

| | Coloring Agent | No. 1 | No. 2 | No. 5 |
|---|---|---|---|---|
| Characteristics of carbon black | Particle size (m$\mu$) | 18 | 18 | 18 |
| | Oil absorption (ml/100 g) | 53 | 53 | 53 |
| | Specific surface area (m$^2$/g) | 200 | 200 | 200 |
| | Total acidity (microequivalents/m$^2$) | 0.83 | 2.3 | 2.3 |
| Performance properties in paints | Dispersibility | 10 | 11 | 14 |
| | Jetness | 10 | 11 | 14 |
| | Gloss | 10 | 11 | 14 |
| | Tinting strength | 10 | 11 | 15 |

As shown in Table 3, Coloring Agent No. 5 of this invention had a high dispersibility and imparted high performance properties of jetness, gloss and tinting strength when used in paint, as compared with Coloring Agents Nos. 1 and 2 of the Reference Examples.

The performance properties of the paints were evaluated by using a melamine-alkyd resin paint the following formula [1]:

| Formula [1] | (wt. parts) |
|---|---|
| Carbon black in paint | 2.6 |
| Short oil alkyd resin varnish (manufactured by Japan Reichhold Chemical Ind.) | 62.4 |
| Butylated melamine resin varnish (manufactured by Hitachi Chemical Co., Ltd.) | 22.2 |
| Thinner for melamine alkyd resin | |

| Formula [1] | (wt. parts) |
|---|---|
| (manufactured by Kansai Paint Co.) | 12.8 |

The properties of the plastics were evaluated by using a polyvinyl chloride colored sheet having the following formula [2]:

| Formula [2] | | | Black sheet | Grey sheet |
|---|---|---|---|---|
| Polyvinyl chloride (plasticizer, stabilizer) | | | 100 | 100 |
| Paste of coloring agent | carbon black in coloring agent | 30% | 0.5 | 0.12 |
| | dioctylphthalate | 50% | mixture | |
| | dispersion agent | 20% | | |
| White polyvinyl chloride (4.1% of TiO$_2$) | | | 0 | 19 |

EXAMPLE 4

Four types of carbon blacks having different particle sizes and the specific surface areas shown in Table 4 were used to prepare Coloring Agents Nos. 3, 9, 10 and 11 in accordance with the process of Example 1, to prepare Coloring Agents Nos. 4, 12, 13 and 14 in accordance with the process of Example 2, and to prepare Coloring Agents Nos. 1, 6, 7 8 in accordance with the process of Reference Example 1 to be used as a standard. The properties of these coloring agents were compared and the results are shown in Table 5.

TABLE 4

| Furnace carbon black (manufactured by Mitsubishi Chemical Industries, Ltd.) | No. 30 | No. 45 | MCF 88 | No. 600 |
|---|---|---|---|---|
| Particle size (m$\mu$) | 30 | 24 | 18 | 16 |
| Specific surface area (m$^2$/g) | 98 | 137 | 200 | 280 |
| Coloring Agents corresponding to Reference Example 1 | No. 6 | No. 7 | No. 1 | No. 8 |
| corresponding to Example 1 | No. 9 | No. 10 | No. 3 | No. 11 |
| corresponding to Example 2 | No. 12 | No. 13 | No. 4 | No. 14 |

TABLE 5

| Coloring Agent | | | No. 6 | No. 9 | No. 12 | No. 7 | No. 10 | No. 13 | No. 1 | No. 3 | No. 4 | No. 8 | No. 11 |
|---|---|---|---|---|---|---|---|---|---|---|---|---|---|
| Particle size of carbon black (m$\mu$) | | | 30 | 30 | 30 | 24 | 24 | 24 | 18 | 18 | 18 | 16 | 16 |
| Granulating ability | | | X | O | O | X | O | O | X | O | O | X | O |
| Performance properties in paints | Black enamel | Jetness | 10 | 10 | 10 | 10 | 11 | 12 | 10 | 13 | 12 | 10 | 15 |
| | | Gloss | 10 | 11 | 11 | 10 | 12 | 13 | 10 | 15 | 14 | 10 | 14 |
| | | Dispersibility | 10 | 11 | 11 | 10 | 12 | 12 | 10 | 13 | 13 | 10 | 14 |
| | Tinting strength of grey enamel | | 10 | 12 | 11 | 10 | 12 | 13 | 10 | 16 | 15 | 10 | 14 |

Note:
O superior
X inferior

As shown in Table 5, it is possible to obtain desirable paints by using the coloring agents prepared in accordance with the processes of Examples 1 and 2 by using carbon blacks having an average particle size of less than 30 m$\mu$. Such carbon blacks are difficult to use when they are formed in accordance with the process of Reference Example 1, using no treating agent.

EXAMPLE 5

Furnace carbon blacks having the properties listed in Table 6 were modified with ozone to give a ttal acidity of 2.0 microequivalents per 1 m$^2$ of the specific surface area of the carbon black in accordance with the process of Reference Example 2. The modified carbon blacks were flushed in accordance with the process of Reference Example 1 to obtain Coloring Agents Nos. 15, 16 and 17.

Table 6

| Carbon black manufactured by (Mitsubishi Chemical Industries Ltd.) | No. 30 | No. 44 | new type |
|---|---|---|---|
| Particle size (m$\mu$) | 30 | 21 | 14 |
| Oil absorption (ml/100 g) | 113 | 72 | 53 |
| Specific surface area (m$^2$/g) | 90 | 125 | 343 |
| Total acidity (micro equivalents/m$^2$) | 0.77 | 0.63 | 0.80 |

For comparison, Coloring Agents Nos. 18, 19 and 20 were prepared by flushing the carbon blacks under the same conditions without modification with ozone. The performance properties of the coloring agents are shown in Table 7.

Table 7

| Coloring Agent | | No. 15 | No. 18 | No. 16 | No. 19 | No. 17 | No. 20 | No. 1 |
|---|---|---|---|---|---|---|---|---|
| Types of carbon black | | No. 30 | No. 30 | No. 44 | No. 44 | new | new | MCF 88 |
| Ozone treatment | | O | none | O | none | O | none | none |
| Total acidity (micro equivalent/m$^2$) | | 2.0 | 0.77 | 2.0 | 0.63 | 2.0 | 0.63 | 0.85 |
| Performance properties in paint | Dispersibility | 14 | 14 | 14 | 14 | 14 | 6 | 10 |
| | Jetness | 3 | 3 | 3 | 3 | 15 | 8 | 10 |
| | Gloss | 12 | 12 | 12 | 12 | 14 | 7 | 10 |

(Note:
O: refers to the ozone treatment of Reference Example 2.)

As shown in Table 7, Coloring Agent No. 17 prepared by using a carbon black having a small particle size, high specific surface area and low oil absorption enables an excellent improvement of performance properties. On the other hand, Coloring Agents Nos. 15 and 16 prepared by using a carbon black having a large particle size and low specific surface area results in a relatively small improvement of the performance properties. A carbon black having a large particle diameter imparts a low level of jetness and is not suitable for use as a high or middle grade color carbon black.

EXAMPLE 6

Coloring Agents Nos. 21, 22, 3, 23, and 24 were prepared in accordance with the process of Example 1 except the amount of HNO$_3$ was changed as indicated in Table 8. The performance properties of the resultant coloring agents were compared with those of Coloring Agent No. 1 prepared in Reference Example 1. The results are also shown in Table 8.

Table 8

| Color Agent | | No. 1 | No. 21 | No. 22 | No. 3 | No. 23 | No. 24 |
|---|---|---|---|---|---|---|---|
| HNO$_3$ (mole/unit of s s a of carbon black) | | 0 | 1 × 10$^{-6}$ | 5 × 10$^{-6}$ | 48 × 10$^{-6}$ | 100 × 10$^{-6}$ | 120 × 10$^{-6}$ |
| Granulating ability | | X | Δ | O | O | Δ | X |
| Properties | Black enamel Jetness | 10 | 11 | 12 | 13 | 12 | 12 |
| | Gloss | 10 | 12 | 14 | 15 | 14 | 13 |

Table 8-continued

| Color Agent | | No. 1 | No. 21 | No. 22 | No. 3 | No. 23 | No. 24 |
|---|---|---|---|---|---|---|---|
| in paint | Dispersibility | 10 | 11 | 13 | 13 | 12 | 12 |
| | Tinting strength in grey enamel | 10 | 11 | 14 | 16 | 14 | 12 |
| Properties in plastics | Black sheet Jetness | 10 | 11 | 12 | 12 | 11 | 9 |
| | Black sheet Dispersibility | 10 | 10 | 13 | 14 | 12 | 10 |
| | Tinting strength in grey sheet | 10 | 10 | 12 | 13 | 11 | 9 |

Note:
O: superior
Δ: good
X: inferior
s s a: specific surface area

As shown in the table, when the amount of nitric acid used for the modification was small, the granulating ability and tinting strength of the coloring agents were not significantly improved. On the other hand, when the amount of nitric acid was too large, the granulating ability was inferior, although the tinting strength was high. The coloring agents prepared according to the specifications of this invention imparted excellent jetness and gloss to their products.

EXAMPLE 7

Coloring Agents Nos. 25, 26, 4, 27 and 28 were prepared in accordance with the process of Example 2 except for a change in the amount of $H_2O_2$ (See Table 9). The performance properties of the coloring agents were compared with those of Coloring Agent No. 1 prepared in Reference Example 1. The results are shown in Table 9.

Table 9

| Coloring Agent | | No. 1 | No. 25 | No. 26 | No. 4 | No. 27 | No. 28 |
|---|---|---|---|---|---|---|---|
| $H_2O_2$ (mole/unit of s s a of carbon black) | | 0 | $2 \times 10^{-6}$ | $5 \times 10^{-6}$ | $14.7 \times 10^{-6}$ | $35 \times 10^{-6}$ | $50 \times 10^{-6}$ |
| Granulating ability | | X | Δ | O | O | Δ | X |
| Properties in paint | Black enamel Jetness | 10 | 11 | 12 | 12 | 13 | 12 |
| | Black enamel Gloss | 10 | 12 | 14 | 14 | 15 | 12 |
| | Dispersibility | 10 | 11 | 13 | 13 | 13 | 11 |
| | Tinting strength in grey enamel | 10 | 11 | 14 | 15 | 14 | 12 |
| Properties erties | Black sheet Jetness | 10 | 11 | 12 | 11 | 12 | 9 |
| | Black sheet Dispersibility | 10 | 10 | 13 | 14 | 13 | 9 |
| in plastics | Tinting strength in grey sheet | 10 | 10 | 12 | 12 | 12 | 9 |

Note:
O: superior
Δ: good
X: inferior
s s a: specific surface area

As shown in Table 9, when the amount of hydrogen peroxide used for the modification was small, the granulating ability and tinting strength of the coloring agents were not greatly improved. On the other hand, when the amount of hydrogen peroxide was too large, the granulating ability was inferior, although the tinting strength was high. The coloring agents prepared by this invention imparted excellent jetness and gloss to their products.

EXAMPLE 8

Coloring Agents Nos. 3 and 29 were prepared in accordance with the process of Example 1 except for use of nitric acid and chromic anhydride. The performance properties of the coloring agents were compared with those of Coloring Agent No. 1 prepared in Reference Example 1. The results are shown in Table 10.

Table 10

| Coloring Agent | | No. 1 | No. 3 | No. 29 |
|---|---|---|---|---|
| Type of modifier | | none | $HNO_3$ | $CrO_3$ |
| Granulating ability | | X | O | O |
| Properties in paint | Black enamel Jetness | 10 | 13 | 13 |
| | Black enamel Gloss | 10 | 15 | 14 |
| | Black enamel Dispersibility | 10 | 13 | 12 |
| | Tinting strength in grey enamel | 10 | 10 | 14 |
| | Black Jetness | 10 | 12 | 12 |
| Properties in plastics | sheet Dispersibility | 10 | 14 | 13 |
| | Tinting strength in grey sheet | 10 | 13 | 13 |

As shown in Table 10, Coloring Agents Nos. 2 and 29 imparted excellent properties to the paints and plastics.

EXAMPLE 9

In accordance with the process of Reference Example 1, 15 kg of furnace carbon black of Example 1, 84 kg of water and $2.1 \times 10^{-6}$ mole of $KMnO_4$ per unit of the specific surface area of the carbon black were charged to prepare an aqueous slurry while stirring. 20 kg of toluene was gradually added to the mixture with stirring to flush it. The product was dehydrated by centrifugal dehydration and dried to obtain Coloring Agent No. 30. The performance properties of Coloring Agent No. 30 were as excellent in comparison with those of Coloring Agent No. 1 as were those of the coloring agent modified with hydrogen peroxide. The results are shown in Table 11.

Table 11

| Coloring Agent | No. 1 | No. 30 |
| --- | --- | --- |
| Type of modifier | none | $KM_nO_4$ |

| | |
| --- | --- |
| (manufactured by Showa Varnish Co., Ltd.) | |
| Carbon black | 25 wt. parts |

The mixture was kneaded through a three roller mill. The degree of blackness was visually evaluated by comparing printed samples using the inks. The method of evaluation corresponded to that used previously. The dispersibility was measured by Japanese Industrial Standard K5701 (1952). The flow property was measured by a Spread-O-Meter (manufactured by Toyo-Seiki Co., Ltd.).

Table 12

| Coloring Agent | | No. 1 | No. 3 | No. 31 | No. 32 | No. 33 | No. 34 | No. 35 |
| --- | --- | --- | --- | --- | --- | --- | --- | --- |
| Hydrophobic vehicle | | none | Tol. | L.O. | D.O.P. | Var. sol. | M.A. var. | Bu. |
| Amount of vehicle (g/g carbon black) | | 0 | 1.1 | 0.7 | 0.7 | 0.7 | 0.7 | 1.3 |
| Granulating ability | | X | O | O | O | O | O | O |
| Properties in ink | Degree of Blackness | 10 | 12 | 13 | | 14 | | |
| | Dispersibility | 10 | 11 | 12 | | 14 | | |
| | Flow property | 10 | 11 | 14 | | 13 | | |
| Properties in paint | Black enamel Jetness | 10 | 13 | 13 | 13 | | 14 | 13 |
| | Gloss | 10 | 15 | 12 | 13 | | 16 | 14 |
| | Dispersibility | 10 | 13 | 13 | 12 | | 14 | 14 |
| | Tinting strength in grey enamel | 10 | 16 | 14 | 13 | | 16 | 15 |
| Properties in plastics | Black sheet Jetness | 10 | 12 | | 14 | | | 12 |
| | Dispersibility | 10 | 14 | | 14 | | | 13 |
| | Tinting strength in grey sheet | 10 | 13 | | 14 | | | 12 |

Note:
Tol.: toluene
L.O.: light mineral oil
D.O.P.: dioctylphthalate
Var. sol.: varnish for printing ink + solvent
M.A. var.: melamine alkyd varnish for paint
Bu.: butanol
O: superior
X: inferior

| Properties in paint | Jetness | 10 | 14 |
| --- | --- | --- | --- |
| | Gloss | 10 | 14 |
| | Dispersibility | 10 | 13 |
| | Tinting strength | 10 | 14 |

EXAMPLE 10

In accordance with the process of Example 1, except for using various other hydrophobic vehicles, Coloring Agents Nos. 3, 31, 32, 33, 34 and 35 were prepared. The granulating ability and tinting strength of each of the coloring agents were measured. The results are shown in Table 12. The properties of these agents in ink were evaluated as follows:

Preparation of Ink:

| TG varnish | 100 wt. parts |
| --- | --- |

As shown in Table 12, the desirable granulating ability was attained by using various hydrophobic vehicles-solvents, varnishes for ink and paint, and plasticizers for resin. The performance properties in inks, paints, and plastics were all excellent. It is especially preferred to use the appropriate hydrophobic vehicle commonly used for the composition of interest, i.e., ink varnish used for preparation of ink; paint solvent used for preparation of solvent type paint; and plasticizer used for preparation of varnish or plastics.

EXAMPLE 11

In accordance with the process of Example 2, except for using various other hydrophobic vehicles, Coloring Agents Nos. 4, 36, 37, 38, 39 and 40 were prepared. The granulating ability and tinting strength of each of the coloring agents were measured. The results are shown in Table 13. The properties in ink were evaluated as shown in Example 10.

Table 13

| Coloring Agent | No. 1 | No. 4 | No. 36 | No. 37 | No. 38 Var. sol. | No. 39 M.A. var. | No. 40 |
|---|---|---|---|---|---|---|---|
| Hydrophobic vehicle | none | Tol. | L.O. | D.O.P. | Var. sol. | M.A. var. | Bu. |
| Amount of vehicle (g/g carbon black) | 0 | 1.1 | 0.7 | 0.7 | 0.7 | 0.7 | 1.3 |
| Granulating ability | X | O | O | O | O | O | O |
| Properties in ink — Black degree | 10 | 12 | 12 | | 14 | | |
| Properties in ink — Dispersibility | 10 | 10 | 13 | | 13 | | |
| Properties in ink — Flow property | 10 | 11 | 13 | | 13 | | |
| Properties in paint — Black enamel Jetness | 10 | 12 | 12 | 13 | | 13 | 12 |
| Properties in paint — Black enamel Gloss | 10 | 14 | 11 | 12 | | 15 | 13 |
| Properties in paint — Black enamel Dispersibility | 10 | 13 | 13 | 12 | | 14 | 13 |
| Tinting strength in grey enamel | 10 | 15 | 14 | 13 | | 15 | 14 |
| Properties in plastics — Black sheet Jetness | 10 | 11 | | 13 | | | 12 |
| Properties in plastics — Black sheet Dispersibility | 10 | 14 | | 14 | | | 13 |
| Tinting strength in grey sheet | 10 | 12 | | 14 | | | 12 |

Note:
Symbols are the same as in Table 12.

As shown in Table 13, the desirable granulating ability was attained by using the various hydrophobic vehicles-solvents, varnishes for ink and paint, and plasticizers for resin. The performance properties in ink, paint and plastics were all excellent. As stated above, it is especially preferable to use the hydrophobic vehicle used for the composition, such as the varnish for ink used for preparation of ink; the solvent for paint used for preparation of solvent type paint; and the plasticizer used for preparation of varnish or plastics.

EXAMPLE 12

Several of the coloring agents described above were compared with commercial high grade carbon blacks. The results are shown in Table 14 and Table 15. The dispersion test was conducted as follows:

Short time dispersion:
The mixture was dispersed for 30 minutes in the paint-conditioner (manufactured by Red Devil Co.)
Long time dispersion:
The mixture was dispersed for 120 minutes in the same paint-conditioner.

In the case of the manufacture of inks and paints, it is necessary to use high power dispersing machines such as a ball mill or a three roller mill. Accordingly, the productivity was low. However, the coloring agents of the invention had excellent dispersibility. Accordingly, the operation time can be shortened and excellent performance properties equal to or superior to the high grade carbon black coloring agents can be attained.

EXAMPLE 13

In accordance with the process of Example 1, except for changing the temperatures used in the preparation of the aqueous slurry and the flushing operation, Coloring Agents Nos. 2, 41, 42, 43 and 44 were prepared. In accordance with the process of Example 2, except for changing the temperatures used in the preparation of the aqueous slurry and the flushing operation. Coloring Agents Nos. 4, 45, 46, and 47 were prepared. The properties of each of the coloring agents in paints were measured, and compared with those of Coloring Agent No. 1 of Reference Example 1.

Carbon black
M C C: No. 600 manufactured by Mitsubishi Chemical Industries, Ltd.
H C C: Neospectra M-II manufactured by Cities Service Co.

Table 14

| Dispersion | Short time dispersion | | | | | Long time dispersion | | | | |
|---|---|---|---|---|---|---|---|---|---|---|
| Type of coloring Agent | No. 1 | No. 3 | No. 4 | MCC | HCC | No. 1 | No. 3 | No. 4 | MCC | HCC |
| Average particle size (mμ) | 18 | 18 | 18 | 16 | 13 | 18 | 18 | 18 | 16 | 13 |
| Properties in paint — Black enamel Jetness | 10 | 14 | 14 | 13 | 15 | 10 | 13 | 12 | 13 | 17 |
| Properties in paint — Black enamel Gloss | 10 | 16 | 15 | 12 | 16 | 10 | 15 | 14 | 11 | 15 |
| Properties in paint — Dispersibility | 10 | 15 | 14 | 9 | 12 | 10 | 13 | 13 | 11 | 14 |
| Tinting strength in grey enamel | 10 | 17 | 15 | 10 | 14 | 10 | 16 | 16 | 12 | 17 |

Table 15

|  | Coloring Agent | No. 5 | No. 17 | 600 | Neo-spectral M-II |
|---|---|---|---|---|---|
| Carbon black | Average particle size (mμ) | 18 | 14 | 14 | 13 |
|  | Oil absorption (ml/100 g) | 55 | 53 | 130 | >150 |
|  | Specific surface area (m²/g) | 200 | 343 | 285 | 906 |
| Properties paint | Dispersibility | 14 | 14 | 12 | 12 |
|  | Jetness | 14 | 15 | 12 | 15 |
|  | Gloss | 15 | 14 | 12 | 14 |
|  | Tinting strength | 15 | 14 | 12 | 15 |

| Coloring Agent | No. 1 | No. 2 | No. 4 | No. 41 | No. 45 | No. 42 | No. 46 | No. 43 | No. 44 | No. 47 |
|---|---|---|---|---|---|---|---|---|---|---|
| Temperature in dispersing and flushing operation (° C) | 25 | 25 | 25 | 50 | 50 | 75 | 75 | 90 | 100 | 100 |
| Granulating ability | X | O | O | O | O | O | O | O | X | Δ |
| Properties in paint — Black enamel Jetness | 10 | 13 | 12 | 15 | 14 | 14 | 14 | 14 | 13 | 13 |
| Gloss | 10 | 15 | 14 | 15 | 14 | 15 | 15 | 13 | 12 | 12 |
| Dispersibility | 10 | 13 | 13 | 14 | 14 | 13 | 13 | 12 | 12 | 12 |
| Tinting strength in grey enamel | 10 | 16 | 15 | 16 | 15 | 15 | 15 | 13 | 12 | 12 |

As shown in Table 16, it is not preferred to use a high temperature in the preparation of the aqueous slurry and in the flushing operation. The desirable results were obtained at 25°– 75° C.

EXAMPLE 14

In a powerful vacuum kneading mixer, 20 kg of the furnace carbon black of Example 1, 30 kg of water, $14.7 \times 10^{-6}$ mole of 30% $H_2O_2$ per unit of the specific surface area of the carbon black were charged and the mixture was kneaded for 30 minutes to prepare an aqueous slurry. A 30 kg sample of short oil caster alkyd varnish for paint was added to the aqueous slurry and the mixture was stirred for 20 minutes. The separated water was removed and further kneaded for 30 minutes under reduced pressure to obtain Coloring Agent No. 48. The performance properties of Coloring Agent No. 1 of Reference Example 1, Coloring Agent No. 4 of Example 2 and Coloring Agent No. 48 were compared. The results are shown in Table 17. Coloring Agent No. 48 had excellent performance properties equal to those of Coloring Agent No. 4.

Table 17

| Coloring Agent | | | No. 1 | No. 4 | No. 48 |
|---|---|---|---|---|---|
| Properties in paint | Black enamel | Jetness | 10 | 12 | 12 |
|  |  | Gloss | 10 | 14 | 15 |
|  |  | Dispersibility | 10 | 13 | 14 |
|  | Grey enamel | Tinting strength | 10 | 15 | 16 |
|  |  | Sedimentation | sed. in one day | no sed. | no sed. |

Note:
sed.: sedimentation

The sedimentation of the grey enamel was measured by diluting the grey enamel with a thinner for melamine-alkyd resin so as to produce a 20 ±1 seconds flow-out time measured in a Ford-cup No. 4, and then charging the diluted solution in a test tube having a diameter of 35 mm and a length of 200 mm and visually observing the sedimentation.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A carbon black coloring agent obtained by (1) mixing a hydrophobic vehicle with an aqueous slurry contaning a carbon black obtained by treating a furnace black having a electromicroscopic average particle size of from about 5 to about 35 mμ with a modifier selected from the group consisting of ozone, nitric acid, hydrogen peroxide, chromic acid and permanganate, and (2) removing the water.

2. The carbon black agent of claim 1, wherein the furnace black has an electromicroscopic average particle size of from about 5 to about 20 mμ.

3. The carbon black coloring agent of claim 2, wherein the furnace black is further characterized by having a specific surface area determined by the BET method of from about 180 to about 1200 m²/g and an oil absorption of from about 35 to about 100 ml/100 g.

4. The carbon black coloring agent of claim 3, wherein the furnace black is treated with ozone until the total acidity of the carbon black surface becomes 1.5 – 6.0 microequivalents per sq. meter of the specific surface area of the carbon black.

5. The carbon black coloring agent of claim 3, wherein the carbon black is treated with hydrogen peroxide in an amount of from $2.0 \times 10^{-6}$ to $40 \times 10^{-6}$ mole per unit of the specific surface area of the carbon black.

6. The carbon black coloring agent of claim 3, wherein the furnace black is treated with nitric acid in an amount of from $1.0 \times 10^{-6}$ to $100 \times 10^{-6}$ mole per unit of the specific surface area of the carbon black.

7. The carbon black coloring agent of claim 5, wherein the treatment with $H_2O_2$ is carried out in situ in the aqueous slurry.

8. The carbon black coloring agent of claim 6, wherein the treatment with nitric acid is carried out in situ in the aqueous slurry.

9. The carbon black coloring agent of claim 1, wherein said aqueous slurry containing an oxidized carbon black is obtained by admixing a carbon black with an aqueous solution of the modifier selected from the group consisting of ozone, nitric acid, hydrogen peroxide, chromic acid and permanganate.

10. The carbon black coloring agent of claim 1, wherein said carbon black is oxidized with ozone or nitric acid, and then the resulting oxidized carbon black is admixed with an aqueous medium to form said aqueous slurry containing an oxidized carbon black.

11. The carbon black coloring agent of claim 1, wherein said furnace black having an elecromicroscopic average particle size of about 5 to 20 m$\mu$, a specific BET surface area of about 180 to 1200 m²/g and an oil absorption characteristic of about 35 to 100 ml/100g is oxidized with ozone, and then the oxidized furnace black is admixed with an aqueous medium to form said aqueous slurry containing an oxidized carbon black.

* * * * *